United States Patent
Jacobson et al.

(10) Patent No.: US 12,183,331 B2
(45) Date of Patent: Dec. 31, 2024

(54) SYSTEMS AND METHODS FOR IMPROVING FULFILLMENT OF MEDIA CONTENT RELATED REQUESTS VIA UTTERANCE-BASED HUMAN-MACHINE INTERFACES

(71) Applicant: Spotify AB, Stockholm (SE)

(72) Inventors: Kurt Jacobson, Stoneham, MA (US); Ben Lambert, Cambridge, MA (US); Marcus Isaksson, Stockholm (SE)

(73) Assignee: Spotify AB, Stockholm (SE)

( * ) Notice: Subject to any disclaimer, the term of this patent is extended or adjusted under 35 U.S.C. 154(b) by 30 days.

(21) Appl. No.: 17/366,228

(22) Filed: Jul. 2, 2021

(65) Prior Publication Data

US 2021/0335349 A1 Oct. 28, 2021

Related U.S. Application Data

(63) Continuation of application No. 16/227,996, filed on Dec. 20, 2018, now Pat. No. 11,087,749.

(51) Int. Cl.
*G10L 15/18* (2013.01)
*G10L 15/22* (2006.01)

(52) U.S. Cl.
CPC .......... *G10L 15/1815* (2013.01); *G10L 15/22* (2013.01); *G10L 2015/223* (2013.01)

(58) Field of Classification Search
CPC .............. G10L 15/1815; G10L 15/22; G10L 2015/223; G06F 40/30
See application file for complete search history.

(56) References Cited

U.S. PATENT DOCUMENTS

| | | | |
|---|---|---|---|
| 9,378,740 B1 | 6/2016 | Rosen et al. | |
| 9,922,650 B1 | 3/2018 | Secker-Walker et al. | |
| 10,083,232 B1 * | 9/2018 | Durham | H04N 21/4826 |
| 10,789,041 B2 | 9/2020 | Kim | |
| 10,854,191 B1 | 12/2020 | Geramifard | |
| 11,087,749 B2 | 8/2021 | Jacobson | |

(Continued)

FOREIGN PATENT DOCUMENTS

| | | |
|---|---|---|
| WO | 2017/139533 A1 | 8/2017 |
| WO | 2018/022764 A1 | 2/2018 |

OTHER PUBLICATIONS

Bhargava, A. et al. "Easy Contextual Intent Prediction and Slot Detection", IEEE Int'l Conference on Acoustics, Speech and Signal Processing, May 26-31, Vancouver, BC, Canada (2013).

(Continued)

*Primary Examiner* — Linda Wong
(74) *Attorney, Agent, or Firm* — McDonnell Boehnen Hulbert & Berghoff LLP

(57) ABSTRACT

Systems, methods, and devices for human-machine interfaces for improving machine understanding and fulfillment of utterance-based requests provided via the interfaces. Multiple candidate understandings from multiple stages of a natural language processing flow are preserved for arbitration and choosing by an arbitrator that applies arbitration rules to the plurality of candidates and chooses a single candidate for initiation of a corresponding service. In an embodiment, the arbitrator uses a media content taste profile to choose a candidate understanding for initiation of a corresponding service.

18 Claims, 7 Drawing Sheets

(56) References Cited

U.S. PATENT DOCUMENTS

| | | |
|---|---|---|
| 2008/0250067 A1* | 10/2008 | Svendsen ............ G06F 16/4387 |
| 2015/0302002 A1 | 10/2015 | Mathias et al. |
| 2016/0171905 A1 | 6/2016 | Nusbaum |
| 2016/0307567 A1 | 10/2016 | Boies |
| 2017/0256256 A1 | 9/2017 | Wang |
| 2017/0278514 A1 | 9/2017 | Mathias et al. |
| 2018/0125689 A1 | 5/2018 | Perez |
| 2018/0211662 A1 | 7/2018 | Yamaguchi |
| 2018/0330723 A1* | 11/2018 | Acero .................... G10L 25/78 |
| 2018/0350366 A1 | 12/2018 | Park |
| 2019/0147763 A1 | 5/2019 | Nusbaum |
| 2019/0176820 A1 | 6/2019 | Pindeus |
| 2019/0220902 A1 | 7/2019 | Sakata |
| 2020/0074993 A1 | 3/2020 | Lee |
| 2020/0258503 A1 | 8/2020 | Maeda |
| 2021/0065708 A1 | 3/2021 | Nishikawa |

OTHER PUBLICATIONS

Extended European Search Report from European Appln. No. 19215503.4, mailed Apr. 30, 2020.
European Communication pursuant to Article 94(3) EPC in Application 19215503.4, mailed Jan. 13, 2022, 6 pages.
European Summons to attend oral proceedings in Application 19215503.4, mailed Apr. 11, 2022, 8 pages.
European Decision to Refuse in Application 19215503.4, mailed Oct. 19, 2022, 20 pages.

* cited by examiner

SYSTEMS AND METHODS FOR IMPROVING FULFILLMENT OF MEDIA CONTENT RELATED REQUESTS VIA UTTERANCE-BASED HUMAN-MACHINE INTERFACES

CROSS-REFERENCE TO RELATED APPLICATION(S)

This application is a continuation of U.S. application Ser. No. 16/227,996, and which application is incorporated herein by reference. To the extend appropriate, a claim of priority is made to the above disclosed application.

TECHNICAL FIELD

The present disclosure relates to technical solutions for human-machine interfaces, particularly utterance-based human-machine interfaces used for media content management.

BACKGROUND

Human-machine interfaces that allow human-machine interactions using natural language processing are becoming ubiquitous, in recent times in the form of smart home appliances. Such appliances, however, continue to have limited capabilities because they lack the technical ability to process complex voice-based commands related to complex tasks. For example, in the domain of media content delivery, there are technical challenges in deciphering a request for an action to be performed relating to media content and then fulfilling the request in a suitable manner. Improvements to natural language processing systems are needed to improve the ability of a computer to process and understand utterances and thereby improve the ability of a computer to interact with a user.

U.S. Pat. No. 9,378,740 describes identifying and providing command suggestions during automatic speech recognition, including generating an n-best list of transcriptions for an utterance.

U.S. Patent Application Publication No. US 2017/0278514 describes performing natural language understanding where commands and entity types may be determined for incoming text queries without necessarily determining a domain for the incoming text. Usage of intent and slot combinations is described.

International Patent Application Publication No. WO 2017/139533 describes controlling multiple entertainment systems and/or speakers using voice commands and assigning a probability or a confidence score to the different ways a spoken utterance may be interpreted by automatic speech recognition.

International Patent Application Publication No. WO 2018/022864 describes using confidence scores with the different ways a spoken utterance may be interpreted.

Bahrgava et al., "Easy Contextual Intent Prediction and Slot Detection", 2013 IEEE International Conference on Acoustics, Speech and Signal Processing, available at https://ieeexplore.ieee.org/document/6639291, describes using intent prediction and slot detection to interpret utterances.

SUMMARY

The present disclosure provides methods, apparatuses, and computer-readable products for utterance-based human-machine interfaces for media content management.

In a natural language processing system, there are several layers where decisions are made. If an output of one component is incorrect, the later components have little chance of providing a correct output. For instance, if a text-to-speech system incorrectly transcribes the name of a musician as uttered by a user, there is little likelihood that the later components will ultimately select and play songs by the correct musician. This technical shortcoming reduces the ability of devices to interact with a user, and wastes processing resources by providing incorrect output.

In general terms, the present disclosure provides one or more solutions to the technical shortcomings described above. In general, a technical solution to this challenge involves each component of the natural language processing system providing a set of output, rather than just a single output. Typically, components of natural language processing systems provide a single output having a high-confidence of correctness value (e.g., a value indicating a confidence that transcription of speech to text is correct). However, at times a choice other than the one having a high-confidence of correctness value at an early stage of the system might lead to a better result at a later stage. By preserving and providing sets of multiple possible outputs at multiple stages of the utterance processing, there is a greater chance that the ultimate fulfillment of the request will be correct, i.e., suitable for the request that was uttered.

In accordance with certain aspects of the present disclosure, a natural language processing system includes: an automated speech recognizer configured to generate a plurality of text transcriptions from an utterance; a natural language understanding system configured to receive the plurality of text transcriptions and provide a plurality of meaning representations as output; and a fulfillment manager configured to receive the plurality of meaning representations and start a service based thereon, wherein the fulfillment manager includes: a fulfillment strategy data store that stores a plurality of fulfillment strategies, wherein each fulfillment strategy of the plurality of fulfillment strategies describes rules for starting a service; a strategy selector configured to select one or more selected fulfillment strategies from the plurality of fulfillment strategies based on a given meaning representation; and an arbitrator configured to receive a plurality of selected fulfillment strategies and choose a chosen fulfillment strategy and cause execution of the chosen fulfillment strategy, wherein the arbitrator is configured to choose the chosen fulfillment strategy based on at least one of: i) a taste profile of an account associated with the utterance; and ii) all of a first set of confidence scores provided by the automated speech recognizer, a second set of confidence scores provided by the natural language understanding system, and a third set of confidence scores provided by the strategy selector. In some examples, the meaning representations are slot-intent models. In some examples, the meaning representations are generated using Abstract Meaning Representation (AMR). In some examples, the meaning representations are generated using first order predicate logic.

In accordance with further aspects of the present disclosure, a natural language processing system includes: an automated speech recognizer configured to generate a plurality of text transcriptions from an utterance; a natural language understanding system configured to receive the plurality of text transcriptions and provide a plurality of slot-intent models as output, wherein each slot-intent model includes an intent and one or more slots having key-value pairs; and a fulfillment manager configured to receive the plurality of slot-intent models and start a service based thereon, wherein the fulfillment manager includes: a fulfillment strategy data store that stores a plurality of fulfillment strategies, wherein each fulfillment strategy of the plurality of fulfillment strategies describes rules for starting a service; a strategy selector configured to select one or more selected fulfillment strategies from the plurality of fulfillment strategies based on a given slot-intent model; and an arbitrator configured to receive a plurality of selected fulfillment strategies and choose a chosen fulfillment strategy and cause execution of the chosen fulfillment strategy, wherein the arbitrator is configured to choose the chosen fulfillment strategy based on at least one of: i) a taste profile of an account associated with the utterance; and ii) all of a first set of confidence scores provided by the automated speech recognizer, a second set of confidence scores provided by the natural language understanding system, and a third set of confidence scores provided by the strategy selector.

In accordance with further aspects of the present disclosure, a non-transitory computer-readable medium stores instructions thereon, which when executed by one or more processors, cause the one or more processors to: generate, using an automated speech recognizer, a plurality of text transcriptions from an utterance; provide, using a natural language understanding system, a plurality of slot-intent models as output, wherein each slot-intent model includes an intent and one or more slots having key-value pairs; and start a service, using a fulfillment manager and based on the plurality of slot-intent models, wherein the using the fulfillment manager includes selecting, using a strategy selector, one or more selected fulfillment strategies from a plurality of fulfillment strategies based on a given slot-intent model; choosing, using an arbitrator, a chosen fulfillment strategy; and executing the chosen fulfillment strategy, wherein the arbitrator is configured to choose the chosen fulfillment strategy based on at least one of: i) a taste profile of an account associated with the utterance; and ii) all of a first set of confidence scores provided by the automated speech recognizer, a second set of confidence scores provided by the natural language understanding system, and a third set of confidence scores provided by the strategy selector.

In accordance with further aspects of a the preset disclosure, a method includes: generating, using an automated speech recognizer, a plurality of text transcriptions from an utterance; providing, using a natural language understanding system, a plurality of slot-intent models as output, wherein each slot-intent model includes an intent and one or more slots having key-value pairs; and starting a service, using a fulfillment manager and based on the plurality of slot-intent models, wherein the using the fulfillment manager includes selecting, using a strategy selector, one or more selected fulfillment strategies from a plurality of fulfillment strategies based on a given slot-intent model; choosing, using an arbitrator, a chosen fulfillment strategy; and executing the chosen fulfillment strategy, wherein the arbitrator is configured to choose the chosen fulfillment strategy based on at least one of: i) a taste profile of an account associated with the utterance; and ii) all of a first set of confidence scores provided by the automated speech recognizer, a second set of confidence scores provided by the natural language understanding system, and a third set of confidence scores provided by the strategy selector.

It can be appreciated that the systems, methods, and computer-readable products of the present disclosure serve a variety of technical advantages and improvements over existing technologies and, particularly, over existing computer technologies directed to media content management fulfillment via natural speech human-machine interfaces. For example, aspects of the methods, systems, and computer-readable products of the present disclosure serve the technical advantage of improving how a machine understands and reacts to naturally vocalized requests for media content management.

BRIEF DESCRIPTION OF THE DRAWINGS

The features and advantages of the present disclosure will become more apparent from the detailed description set forth below when taken in conjunction with the following drawings.

DETAILED DESCRIPTION

The example embodiments presented herein are directed to systems, methods, and non-transitory computer-readable medium products for utterance-based human-machine interfaces used for managing media content. This is for convenience only and is not intended to limit the application of the present invention. After reading the following description, how to implement the following disclosure in alternative embodiments will be apparent to one skilled in the relevant art. For instance, although primarily described in the domain of music, techniques herein are applicable to other kinds of media content, such as other audio content (e.g., audiobooks or podcasts), video content (e.g., shows or movies), game content (e.g., video games), and virtual reality content, among other content. Similarly, it should be appreciated that principles of the present disclosure can be applied outside of media content management altogether, and can be generally applied to improve fulfillment of any form of utterance-based request placed via a human machine interface of a system that processes vocalized natural language.

A media content item is an item of media content, such as an audio content item, a video content item, or other types of media content, which may be stored in any format suitable for storing media content. Non-limiting examples of media content items include songs, albums, audiobooks, music videos, movies, television episodes, podcasts, other types of audio or video content, and portions or combinations thereof.

Device Environment

Figure 1:
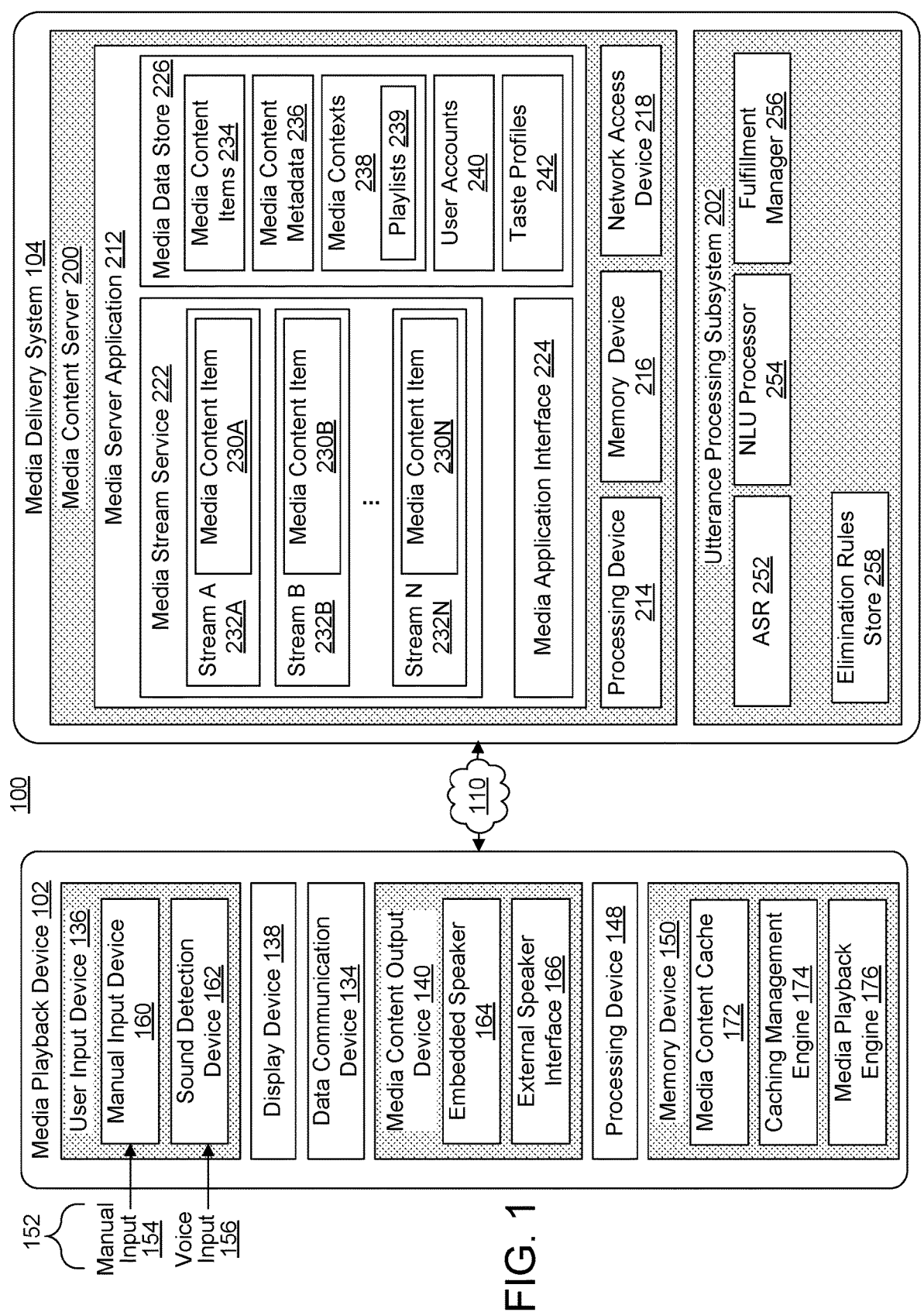
FIG. 1 illustrates an example system for providing an utterance-based human-machine interface.

FIG. 1 is a block diagram of an example media content provision system 100 including a media playback device 102 and a media delivery system 104. In this example, media playback device 102 includes a user input device 136, a display device 138, a data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems. It should be understood that for simplicity FIG. 1 illustrates only one media playback device 102. However, it is envisioned that multiple media playback devices 102 are in use in system 100.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, Blu-ray or DVD player, media player, stereo, or radio.

In some embodiments, the media playback device 102 is a system dedicated for streaming personalized media content in a vehicle environment.

The user input device 136 operates to receive a user input 152 for controlling the media playback device 102. As illustrated, the user input 152 can include a manual input 154 and a voice input 156. In some embodiments, the user input device 136 includes a manual input device 160 and a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of a user query. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a user's voice (also referred to herein as an utterance) for controlling playback of media content via the media playback device 102. For example, the voice input 156 includes a voice version of the user query received from the sound detection device 162 of the media playback device 102. In addition, the voice input 156 is a user's voice for managing various data transmitted via the media playback device 102 and/or controlling other functions or aspects associated with the media playback device 102.

Media playback device 102 can detect the various actions taken in connection with the media content. For example, music playback applications include functions such as rewind, forward, pause, stop, and skip.

Referring still to FIG. 1, the display device 138 operates to display information. Examples of such information include media content playback information, notifications, and other information. In some embodiments, the display device 138 is configured as a touch sensitive display and includes the manual input device 160 of the user input device 136 for receiving the manual input 154 from a selector (e.g., a finger, stylus etc.) controlled by a user. In some embodiments, therefore, the display device 138 operates as both a display device and a user input device. The display device 138 operates to detect inputs based on one or both of touches and near-touches. In some embodiments, the display device 138 displays a graphical user interface for interacting with the media playback device 102. Other embodiments of the display device 138 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 110. For example, the data communication device 134 is configured to communicate with the media delivery system 104 and receive media content from the media delivery system 104 at least partially via the network 110. The data communication device 134 can be a network interface of various types which connects the media playback device 102 to the network 110. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that media output is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, includes one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer-readable media includes any available media that can be accessed by the media playback device 102. By way of example, computer-readable media includes computer readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, Blu-ray discs, digital versatile discs or other optical storage, magnetic storage devices, or any other medium that can be used to store the desired information and that can be accessed by the media playback device 102. In some embodiments, computer-readable storage media is non-transitory computer-readable storage media.

Computer readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The memory device 150 operates to store data and instructions. In some embodiments, the memory device 150 stores instructions for a media content cache 172, a caching management engine 174, and a media playback engine 176.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

In some examples, media content is identifiable through the use of a media content item identifier. Media content is thus retrievable for playback via the use of a media content item identifier. Other media content playback retrieval mechanisms now known or future developed can be used. Individual media content can be referred to as a media object, media content item, or multimedia object. Examples of media content include, songs, albums, music videos, podcasts, audiobooks, movies, radio stations, TV stations, TV shows, books, video games and the like. One or more media content item identifiers can be grouped together to form a media content context, such as a playlist, album, search result list, or season, among others.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content. As described herein, the media playback engine 176 is configured to communicate with the media delivery system 104 to receive one or more media content items (e.g., through the media stream 232). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 104. In some embodiments, the media playback engine 176 is configured to send a request to the media delivery system 104 for media content items and receive information about such media content items for playback.

Referring still to FIG. 1, media delivery system 104 includes a media content server 200 and an utterance processing subsystem 202. The media delivery system 104 includes one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200 and the utterance processing subsystem 202 are provided by separate computing devices. In other embodiments, the media content server 200 and the utterance processing subsystem 202 are provided by the same computing device(s). Further, in some embodiments, at least one of the media content server 200 and the utterance processing subsystem 202 is provided by multiple computing devices. For example, the media content server 200 and the utterance processing subsystem 202 may be provided by multiple redundant servers located in multiple geographic locations.

Although FIG. 1 shows a single media content server 200, and a single utterance processing subsystem 202, some embodiments include multiple media content servers and behavior analyzer servers. In these embodiments, each of the multiple media content servers and behavior analyzer servers may be identical or similar to the media content server 200 and the utterance processing subsystem 202, respectively, as described herein, and may provide similar functionality with, for example, greater capacity and redundancy and/or services from multiple geographic locations. Alternatively, in these embodiments, some of the multiple media content servers and/or the behavior analyzer servers may perform specialized functions to provide specialized services. Various combinations thereof are possible as well.

The utterance processing subsystem 202 includes an automatic speech recognizer (ASR) 252, a natural language understanding (NLU) processor 254, a fulfillment manager 256, and an elimination rules store 258. Each of the ASR 252, the NLU processor 254, the fulfillment manager 256, and the elimination rules store 258 is adapted to receive input and provide output as described in more detail below. It should be appreciated that the various components of the utterance processing subsystem 202 can be, but need not be, stored on the same storage device.

The media content server 200 transmits stream media to media playback devices such as the media playback device 102. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 110. Examples of the network access device 218 include one or more wired network interfaces and wireless network interfaces. Examples of such wireless network interfaces of the network access device 218 include wireless wide area network (WWAN) interfaces (including cellular networks) and wireless local area network (WLAN) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items 230 from the media content server 200. For example, in FIG. 1, the media application interface 224 receives communication from the media playback device 102 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In addition or alternatively, the media content metadata 236 provides various information associated with the media contexts 238. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of a track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the media content metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-d tree or other database format.

Referring still to FIG. 1, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Example Implementations

Figure 2:
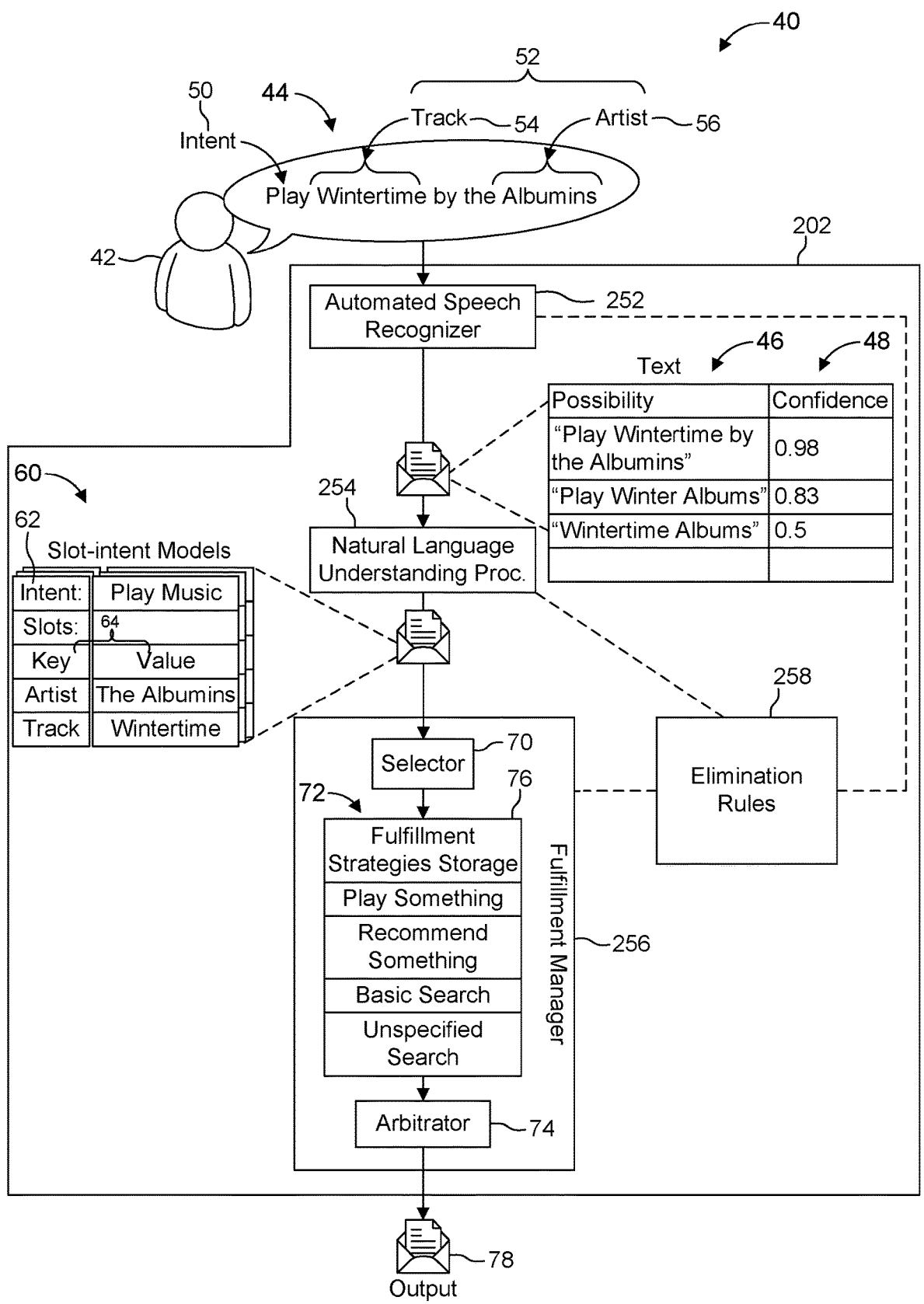
FIG. 2 schematically illustrates a usage example of the utterance processing subsystem of the system of FIG. 1.

FIG. 2 schematically illustrates an implementation 40 of the utterance processing subsystem 202 of the system of FIG. 1. Initially, an utterance 44 uttered by a user 42 is received by media playback device 102 via voice input 156 (FIG. 1). In this example, the utterance 44 uttered by the user 42 includes an intent 50 (in this case to play something) and a target 52 (in this case a track 54) of the intent 50.

It should be understood that the terms utter, utterance and speak generally refer to a spoken word, statement or vocal sound that is used to convey information. Unless a specific meaning is specified for a given use of the terms "utter", "utterance", and "speak", they should be construed to mean any of these senses of the word, all of which are understood as a plain meaning of the terms "utter", "utterance", and "speak" by those having ordinary skill in the art.

In some embodiments, a signal corresponding to the utterance is received as input by the ASR 252 of the utterance processing subsystem 202. The ASR 252 transcribes the audio signal into a plurality of possible text strings, i.e., a plurality of text string hypotheses 46, and assigns to each of the text string hypotheses 46 a confidence score 48 reflecting a likelihood that a given text string hypothesis 46 accurately corresponds to the received utterance 44.

The multiple text string hypotheses 46 are output by the ASR 252 and provided as input to the NLU processor 254. The NLU processor 254 interprets, i.e., attempts to understand, each of the text string hypotheses 46 by generating as output, for each of the text string hypotheses 46, a slot-intent model 60. It should be appreciated that the slot-intent model formalism described with reference to the depicted embodiment is just one example of a meaning representation that can be performed by the NLU processor 254 on the text string hypotheses 46. Other non-limiting example meaning representations that can be generated by the NLU 254 on the text string hypotheses 46 include performing AMR or first order predicate logic.

Each slot-intent model 60 includes an intent 62 and at least one key-value pair corresponding to the target of the intent. In the non-limiting example shown in FIG. 2, a user utters a command "play Wintertime by the Albumins" to a media playback device. A voice recognition system, for example with a trained natural language understanding (NLU) model, analyzes the utterance ("play Wintertime by the Albumins"), transcribes the utterance into text and parses the utterance into its parts, the parts of which have syntactic roles. In some embodiments, the utterance is parsed into an intent and one or more slots. In this example, a slot-intent model corresponding to the text string hypothesis "Play Wintertime by the Albumins" includes the intent "Play Music" and two key:value pairs, a first key value pair of {Artist:The Albumins} and a second key value pair of {Track:Wintertime}. An example slot-intent model for the text string hypothesis "Play Winter Albums" includes an intent 62 of "Play Music" and a key:value pair of {Genre: Winter Holidays}. An example slot-intent model for the text string hypothesis "Wintertime Albums" includes an intent 62 of "Search", a first key:value pair {Genre: Winter Holidays} and a second key:value pair of {Album:Wintertime}.

The slot-intent models 60 output by the NLU processor 254 are then received as input by the fulfillment manager 256. The fulfillment manager 256 includes a selector 70, a fulfillment strategies storage 72, and an arbitrator 74. The selector 70 maps each of the slot intent-models 60 received as input by the fulfillment manager 256 to a fulfillment strategy 76 stored in the fulfillment strategy storage 72.

Each fulfillment strategy 76 describes rules for starting a service. For example, a "Play" fulfillment strategy describes rules that start a play media item service and is assigned to a slot-intent model having a "Play" intent; a "Recommend" fulfillment strategy describes rules that start a recommend media item service and is assigned to a slot-intent model having a "Recommend" intent; a "Basic Search" fulfillment strategy describes rules that start a search media item service using search criteria provided in the corresponding slot-intent model having a "Search" intent, and so forth.

The selected fulfillment strategies output by the selector 70 are then provided as input to the arbitrator 74. The arbitrator 74 chooses one of the selected fulfillment strategies to execute, according to one or more arbitration schemes as described in more detail below. The fulfillment strategy chosen by the arbitrator 74 for execution is then caused to be executed. For example, if the fulfillment strategy chosen for execution by the arbitrator 74 is a "Play" fulfillment strategy, the output 78 from the arbitrator 74 causes a media content item 234 (e.g., a track (FIG. 1) to be retrieved from the media data store 226 (FIG. 1) and played via the media content output device 140 (FIG. 1) using the media stream service 222 (FIG. 1). As another example, if the fulfillment strategy chosen for execution by the arbitrator 74 is a "Recommend" fulfillment strategy, the output 78 from the arbitrator 74 causes one or more tracks to be recommended via the media playback device 102 (FIG. 1).

From the above description, it can be appreciated that the example implementation 40 has multiple stages or levels, including at least an ASR level, an NLU level, and a fulfillment level. The ASR level results in an output of K text string hypotheses. The NLU level results in an output of M slot-intent models. The fulfillment level results in an output of N possible fulfillment strategies for execution. In at least some examples of the system 100 (FIG. 1), each of K, M and N is a positive integer greater than 2, where M is less than or equal to K, and N is less than or equal to M. Thus, for example, the ASR 252 outputs 5 text string hypotheses 46, the NLU outputs 4 slot-intent models 60 corresponding to 4 of the text string hypotheses 46, eliminating one of the text string hypotheses based on the application of one or more elimination rules stored in elimination rules store 258 (e.g., a text string hypothesis confidence score 48 that is too low) stored in or otherwise accessible by the utterance processing subsystem 202, and the selector 70 outputs 3 fulfillment strategies corresponding to each of the slot-intent models 60, eliminating one of the 4 fulfillment strategies based on an application of one or more elimination rules stored in elimination rules store 258 (e.g., a slot-intent model confidence score that is too low).

The N fulfillment strategies together with their corresponding slot intent-models 60 are input to the arbitrator 74. The arbitrator 74 chooses one of the N fulfillment strategy-slot intent model pairings to execute as will be described in greater detail below.

It should be appreciated that elimination of one of the K text string hypotheses 46 or one of the M slot-intent models 60 can be performed before or after the text string hypotheses and slot-intent models are input, respectively to the next level. Thus, for example, either the ASR 252 or the NLU processor 254 (or another component of the utterance processing subsystem 202 that mediates between the ASR 252 and the NLU processor 254) can apply the elimination rules stored in elimination rules store 258 and eliminate zero or more of the candidate text string hypotheses; and either the NLU processor 254 or the fulfillment manager 256 (or another component of the utterance processing subsystem 202 that mediates between the NLU processor 254 and the fulfillment manager 256) can apply the elimination rules stored in elimination rules store 258 and eliminate zero or more of the candidate fulfillment strategies.

Figure 3:
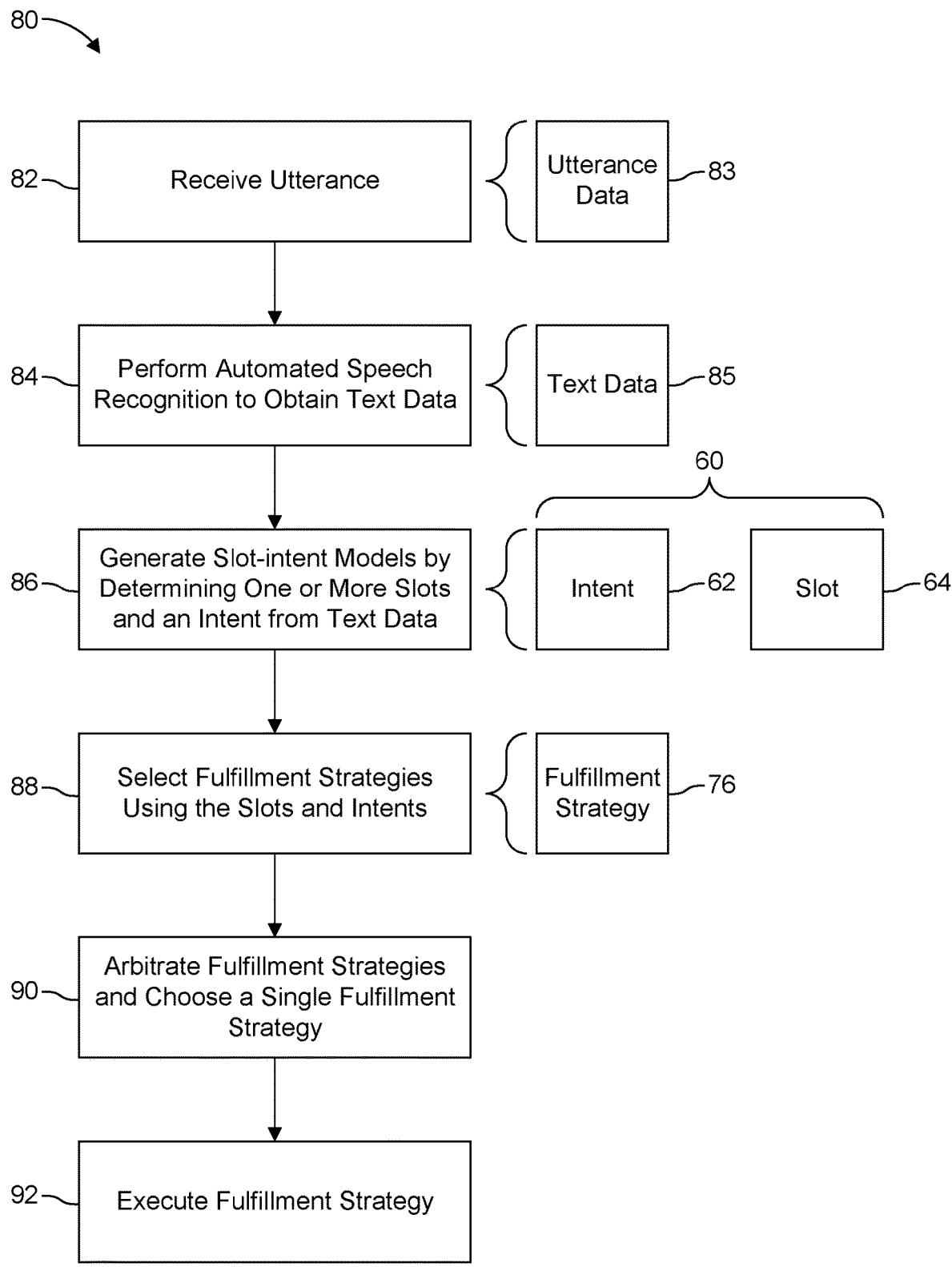
FIG. 3 illustrates an example process flow that can be performed by the system of FIG. 1.

FIG. 3 illustrates an example process flow 80 that can be performed by the utterance processing subsystem 202 of FIG. 1. The process flow 80 determines and executes a media content fulfillment strategy based on a natural language utterance received via the media playback device 102 (FIG. 1).

The process flow begins with operation 82.

Operation 82 includes receiving utterance data 83 (e.g., from media playback device 102 of FIG. 1). The utterance data 83 is data describing the utterance. In many examples, the utterance data 83 is an audio recording that contains the utterance being spoken. In some examples, the utterance data 83 is received as an entire audio data file. For instance, the media playback device 102 buffers the utterance data 83 as the utterance data is obtained from the audio input device (e.g., sound detection device 162 (FIG. 1)). The buffered utterance data 83 is then processed by the one or more processing devices 214 (FIG. 1). In other instances, the media playback device 102 streams the utterance data 83 in real-time to the one or more processing devices 214 (FIG. 1) as the utterance data 83 is received from the audio input device (e.g., sound detection device 162 (FIG. 1.)). In an example, the utterance data 83 is stored in a data store after the utterance data is received. After the utterance data 83 is received, the flow moves to operation 84.

Operation 84 includes performing automated speech recognition on the utterance data 83 to obtain text data 85. In many examples, performing automated speech recognition includes providing the utterance data 83 as input to an automated speech recognition system (e.g., the ASR 252) and receiving the text data 85 as output from the automated speech recognition system. As described above, in at least some examples, there will be multiple text string hypothesis outputs, with a confidence score assigned to each. The confidence score reflects a probability that a given output text string is an accurate transcription of the received utterance.

Automated speech recognition at the operation 84 can be performed using any of a variety of techniques (e.g., using hidden Markov models or neural networks). Examples of automated speech recognition systems include CMU SPHINX, maintained by CARNEGIE MELLON UNIVERSITY, and DEEPSPEECH, maintained by the MOZILLA FOUNDATION. After the text data 85, which in at least some examples includes multiple text string hypothesis outputs, is obtained from the automated speech recognition system, the flow moves to an operation 86.

Operation 86 includes parsing the text strings and thereby determining, via an NLU unit (e.g., the NLU processor 254) a slot-intent model 60 for each text string provided at operation 84, each slot-intent model 60 including an intent 62 and one or more slots 64 corresponding to a natural language understanding of each of the text string hypotheses of the text data 85. Each slot 64 in each slot-model is a key-value pair that describes a portion of the text data 85 having a specific meaning. The intent 62 describes a general intent of the text data 85.

There are also instances where there is an intent 62 but no slot for a given slot-intent model 60. For instance, performing operation 86 on a text string hypothesis of "play" would result in the intent being "play", but would not result in any slots (e.g., the text data does not include a description (i.e., a target) of what to play). In other instances, there are one or more slots 64 but no intent 62 in a given slot-intent model 60. For instance, performing operation 86 on a text string hypothesis of "Jump to the Moon by the Astronauts" would result in two slots 64 (e.g., {Song: Jump to the Moon} and {Artist: Astronauts}) but no intent (e.g., the text data 85 corresponding to the given text string hypothesis does not include a description of what to do with the song and artist, such as search, play, or save).

The operation 86 is performed by the NLU processor 254 (FIG. 2) that is trained to identify the slot-intent model(s), including each slot-intent model's slot(s) and intent for the text data 85 provided as input. The NLU processor 254 (FIG. 2) can be implemented in a variety of ways, including using a support vector machine, a finite state machine, or a conditional random fields model, among others. With the slot-intent model(s) 60 determined, the flow moves to operation 88.

Operation 88 includes determining one or more candidate fulfillment strategy(ies) 76 using the slot-intent model(s) 60. At the operation 88, the fulfillment manager 256 (FIG. 12 selects, for each of the slot-intent models 60, a fulfillment strategy 76 (FIG. 2) from among a plurality of fulfillment strategies 76 stored in the fulfillment strategies storage 72 (FIG. 2).

In some examples, for each slot-intent model 60, the fulfillment manager 256 (FIG. 2) follows a decision tree based on the intent and the slot(s) of the given slot model 60. In another example, for a given slot-intent model 60, a given fulfillment strategy 76 defines requirements (e.g., a play fulfillment strategy may require a play intent) and the fulfillment manager selects the fulfillment strategy from among the fulfillment strategies based on requirements being met or unmet. Once the fulfillment strategy(ies) is/are selected, the flow 80 moves to operation 90.

At operation 90, the arbitrator 74 (FIG. 2) chooses one of a plurality of candidate fulfillment strategies to be executed at operation 92. For example, where the fulfillment strategy 76 selected from the group of candidate fulfillment strategies is a play fulfillment strategy, a media content item associated with a slot of the slot-intent model corresponding to the selected media fulfillment strategy is selected and playback of the media content item is initiated. In another example, the selected fulfillment strategy 76 for execution at operation 92 corresponds to a list playlists strategy that is executed by selecting one or more playlists (from the playlists 239 (FIG. 1)) and providing the list as output via the media playback device 102 (FIG. 1).

Referring again to FIG. 2, as discussed above, the fulfillment strategies storage 72 stores a plurality of fulfillment strategies 76. Each fulfillment strategy 76 describes rules for starting a service (e.g., a play fulfillment strategy that starts a play song service). The strategy selector 70 is a component configured to select a fulfillment strategy from the plurality of fulfillment strategies based on a given slot-intent model 60 that is provided to the selector 70 as input. The arbitrator 74 is a component configured to receive a plurality of selected fulfillment strategies and choose a chosen fulfillment strategy. The arbitrator 74 then causes execution of the chosen fulfillment strategy.

As described above, to choose a chosen fulfillment strategy the arbitrator 74 uses an arbitration scheme. The arbitration schemes can be stored as rules accessible by the arbitrator 74.

According to a first example arbitration scheme, the arbitrator 74 chooses the chosen fulfillment strategy based at least in part on a taste profile 242 (FIG. 1) of an account associated with the utterance.

Figure 4A:
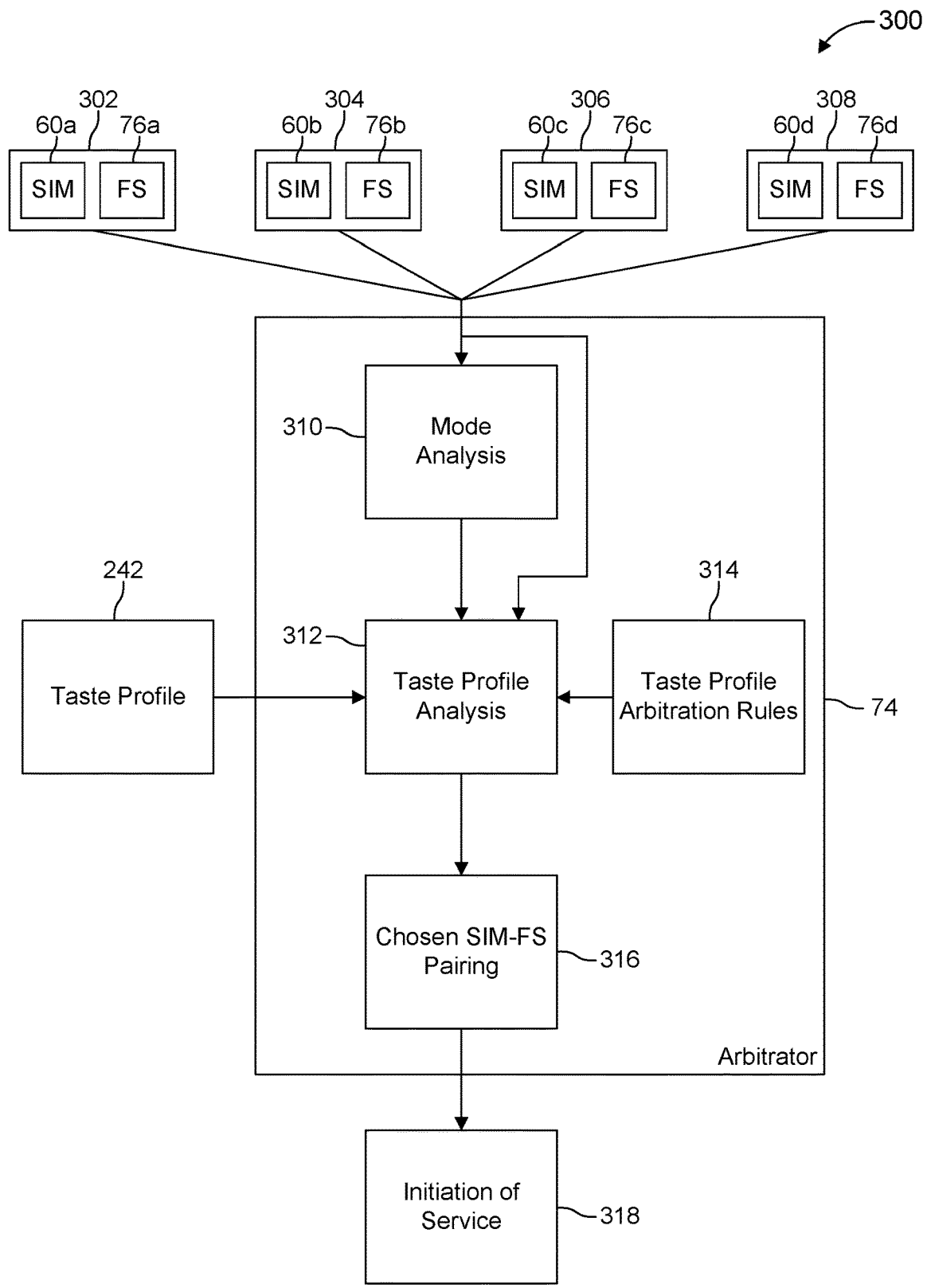
FIG. 4A schematically illustrates a first arbitration carried out by the arbitrator of FIG. 2.
Figure 4B:
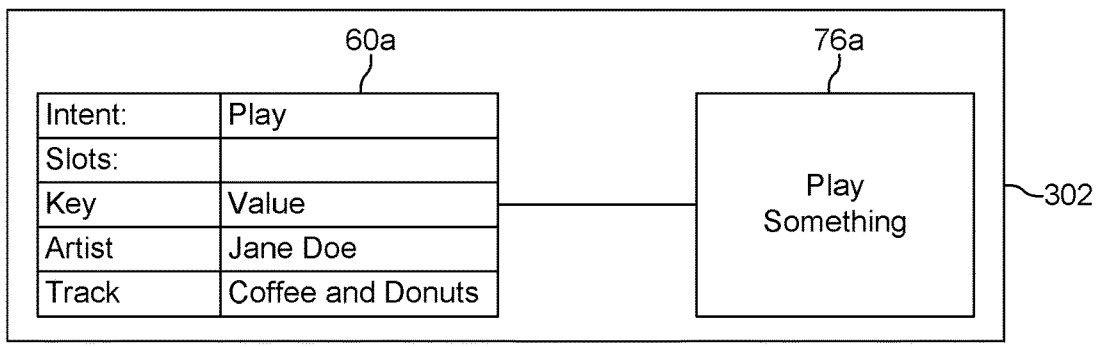
FIG. 4B schematically illustrates one of the slot intent model fulfillment strategy pairings of FIG. 4A.
Figure 4C:
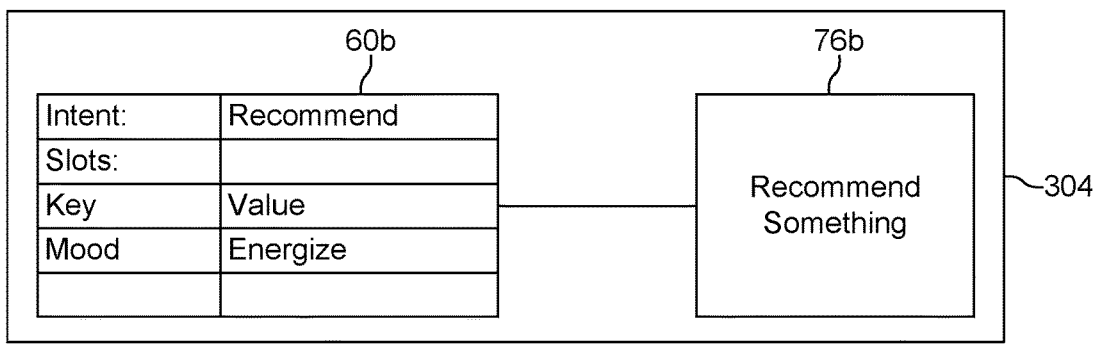
FIG. 4C schematically illustrates another of the slot intent model fulfillment strategy pairings of FIG. 4A.
Figure 4D:
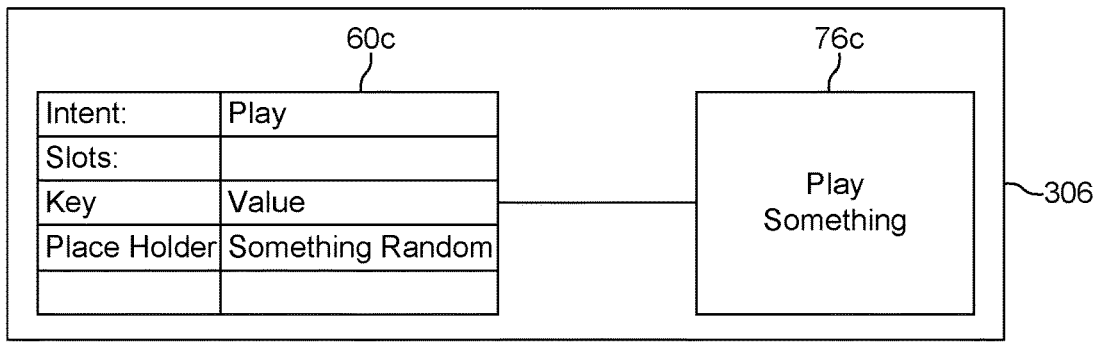
FIG. 4D schematically illustrates another of the slot intent model fulfillment strategy pairings of FIG. 4A.
Figure 4E:
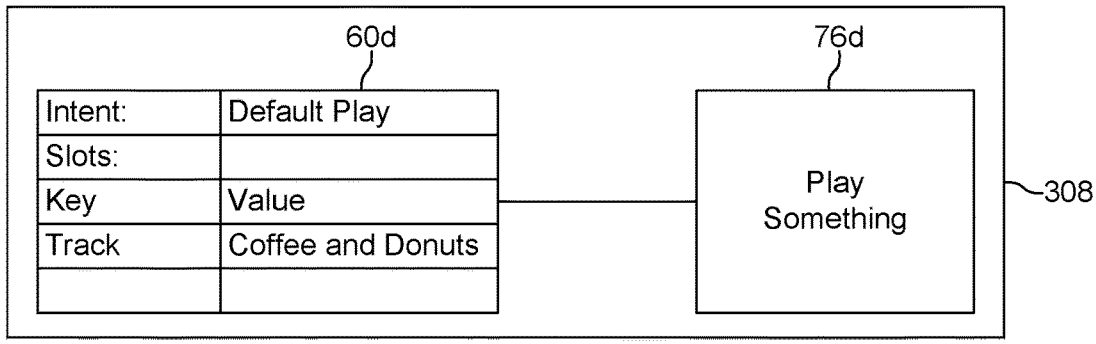
FIG. 4E schematically illustrates another of the slot intent model fulfillment strategy pairings of FIG. 4A.

FIG. 4A schematically illustrates a first arbitration 300 carried out by the arbitrator 74 of FIG. 2 according to an example arbitration scheme, using in part a taste profile 242 associated with a user account 240 (FIG. 1) to perform the arbitration. In this example, the arbitrator 74 receives first, second, third, and fourth slot-intent model fulfillment strategy (SIM-FS) pairings associated with an utterance received via the media playback device 102 (FIG. 1). The first SIM-FS pairing 302 includes a slot-intent model 60a and a fulfillment strategy 76a. The second SIM-FS pairing 304 includes a slot-intent model 60b and a fulfillment strategy 76b. The third SIM-FS pairing 306 includes a slot-intent model 60c and a fulfillment strategy 76c. The fourth SIM-FS pairing 308 includes a slot-intent model 60d and a fulfillment strategy 76d.

FIGS. 4B-4E illustrate the SIM-FS pairings of FIG. 4A in greater detail. FIGS. 4A through 4E are referred to herein collectively as FIG. 4.

Referring to FIG. 4, the first slot-intent model 60a includes an intent of "Play," a first {key:value} pair of Artist:Jane Doe and a second {key:value} pair of {Track: Coffee and Donuts}. The second slot-intent model 60b includes an intent of "Recommend," and a single {key:value} pair of {mood:energize}. The third slot-intent model 60c includes an intent of "Play" and empty or null {key:value} pairs. The fourth slot-intent model 60d includes an empty or null intent, and a {key:value} pair of {Track: Coffee and Donuts}. In the example provided, the null entities are filled with placeholder values, e.g., by the fulfillment manager 256 (FIG. 2) or the NLU processor 254 (FIG. 1). The placeholder values can be generic default values, or default values tailored to affirmative information that is available in the SIM-FS pairing. In this particular example, the null entity in the third slot-intent model 60c is filled with the placeholder value "Something Random", and the null entity in the fourth slot-intent model is filled with the default value, "Play".

In some examples, the arbitrator 74 performs a mode analysis 310 on the inputs it receives. The mode analysis 310 is an example of a set of rules that are applied by the arbitrator 74 to choose a chosen SIM-FS pairing for execution. The results of the mode analysis can, in some examples, determine by themselves the SIM-FS pairing that is chosen by the arbitrator 74. In other examples, the results of the mode analysis merely contribute to the overall arbitration analysis performed by the arbitrator 74. In the example arbitration 300, the mode analysis 310 performed by the arbitrator 74 identifies two instances of the {key:value} pair {Track: Coffee and Donuts} and two instances of the intent "Play". Based on the higher incidences of the {key:value} pair {Track: Coffee and Donuts} and the intent "Play", in some examples the arbitrator 74 places a higher weight on the SIM-FS pairings corresponding to those higher incidences. In some examples, the arbitrator 74 eliminates one or more SIM-FS pairings due to a relatively low incidence.

According to the arbitration example 300, whether or not a mode analysis 310 is performed, the various SIM-FS pairings 302, 304, 306, 308, or a subset thereof if any of the SIM-FS pairings have already been eliminated by the mode analysis 310, are further arbitrated by the arbitrator 74 using a taste profile 242 (FIG. 1) associated with an account and by employing a taste profile analysis 312. That is, the arbitrator chooses a chosen one of the SIM-FS pairings by determining, using taste profile arbitration rules 314, which SIM-FS pairing most closely aligns with the taste profile 242 (FIG. 1). In the arbitration 300, for example, the arbitrator 74 determines that the SIM-FS pairing 302 is most closely aligned with the taste profile 242 associated with the account because that taste profile indicates an affinity for the artist Jane Doe (or a type of artist with which Jane Doe is affiliated) that exceeds an affinity associated with any of the other SIM-FS pairings. As a result the chosen SIM-FS pairing 316 as chosen by the arbitrator 74 is the SIM-FS pairing 302, causing initiation 318 of a playback service that plays back the track Coffee and Donuts by Jane Doe.

Thus, in some examples taste profile attributes are compared with attributes of the SIM-FS pairings and the SIM-FS pairing that most closely aligns with one or more taste profile attributes is selected for execution.

Figure 5:
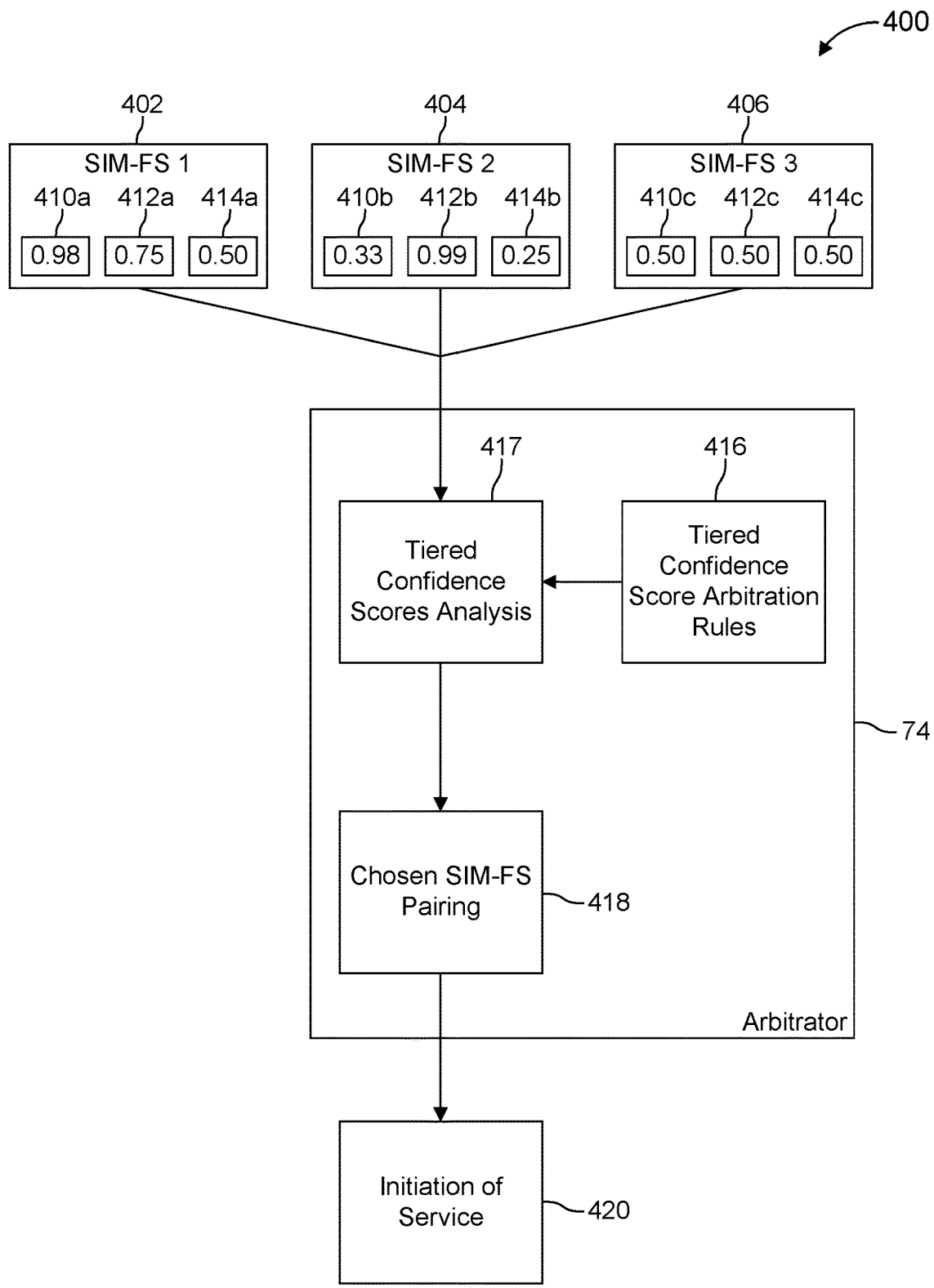
FIG. 5 schematically illustrates a second arbitration carried out by the arbitrator of FIG. 2.

FIG. 5 schematically illustrates a second arbitration 400 carried out by the arbitrator 74 of FIG. 2 according to a further example arbitration scheme, using in part a multi-level set of a confidence scores.

Referring to FIG. 5, according to a second example arbitration 400, the arbitrator 74 chooses the chosen SIM-FS pairing by ranking the plurality of selected fulfillment strategies output by the selector 70 (FIG. 2) using a machine-learned ranking approach. For example, the arbitrator 74 may use LambdaMART, LambdaRank, RankNet, or another technique. These techniques are generally referred to as solvers for "learning-to-rank" problems.

In the particular arbitration 400, three SIM-FS pairings 402, 404, and 406 are input to the arbitrator 74. Each of the SIM-FS pairings is tagged with a plurality of confidence scores, including an ASR confidence score 410a, 410b, 410c (collectively 410), a NLU confidence score 412a, 412b, 412c (collectively 412), and a strategy selection confidence score 414a, 414b, 414c (collectively 414). The ASR confidence score can be provided by the ASR 252 (FIG. 1). The NLU confidence score can be provided by the NLU processor 254 (FIG. 1). The strategy selection confidence score can be provided by the strategy selector 70 (FIG. 1).

The arbitrator 74 applies multi-level confidence score arbitration rules 416 using the multi-level confidence score inputs 410, 412, 414 to perform a multi-level confidence score analysis 417 and thereby choose the chosen SIM-FS pairing 418 for service initiation 420. That is, according to the arbitration 400, the arbitrator 74 chooses the chosen SIM-FS pairing 418 based at least in part on the automated speech recognizer confidence scores 410, the NLU confidence scores 412, and the strategy selector confidence scores 414.

In one non-limiting example, one or more of the multi-level confidence score arbitration rules 416 weights one or more of the confidence scores 410, 412, 414 more heavily than another. In another non-limiting example, one or more of the multi-level confidence score arbitration rules 416 calculates a sum of the confidence scores 410, 412, 414 in each of the SIM-FS pairings input to the arbitrator 74 and compares the sums.

It should be appreciated that the arbitrations 300 (FIG. 4) and 400 described above represent non-limiting examples of arbitration schemes that can be performed by the arbitrator 74. In some examples, rules from multiple arbitration schemes (such as the taste profile arbitration rules 314 and multi-level confidence score arbitration rules 416 from the first and second example arbitrations 300 and 400, respectively, described above) are combined and the arbitrator 74 chooses the chosen SIM-FS pairing by applying rules from the multiple schemes, e.g., by using both a taste profile associated with an account and a ranking technique using multi-level confidence scores.

Figure 6:
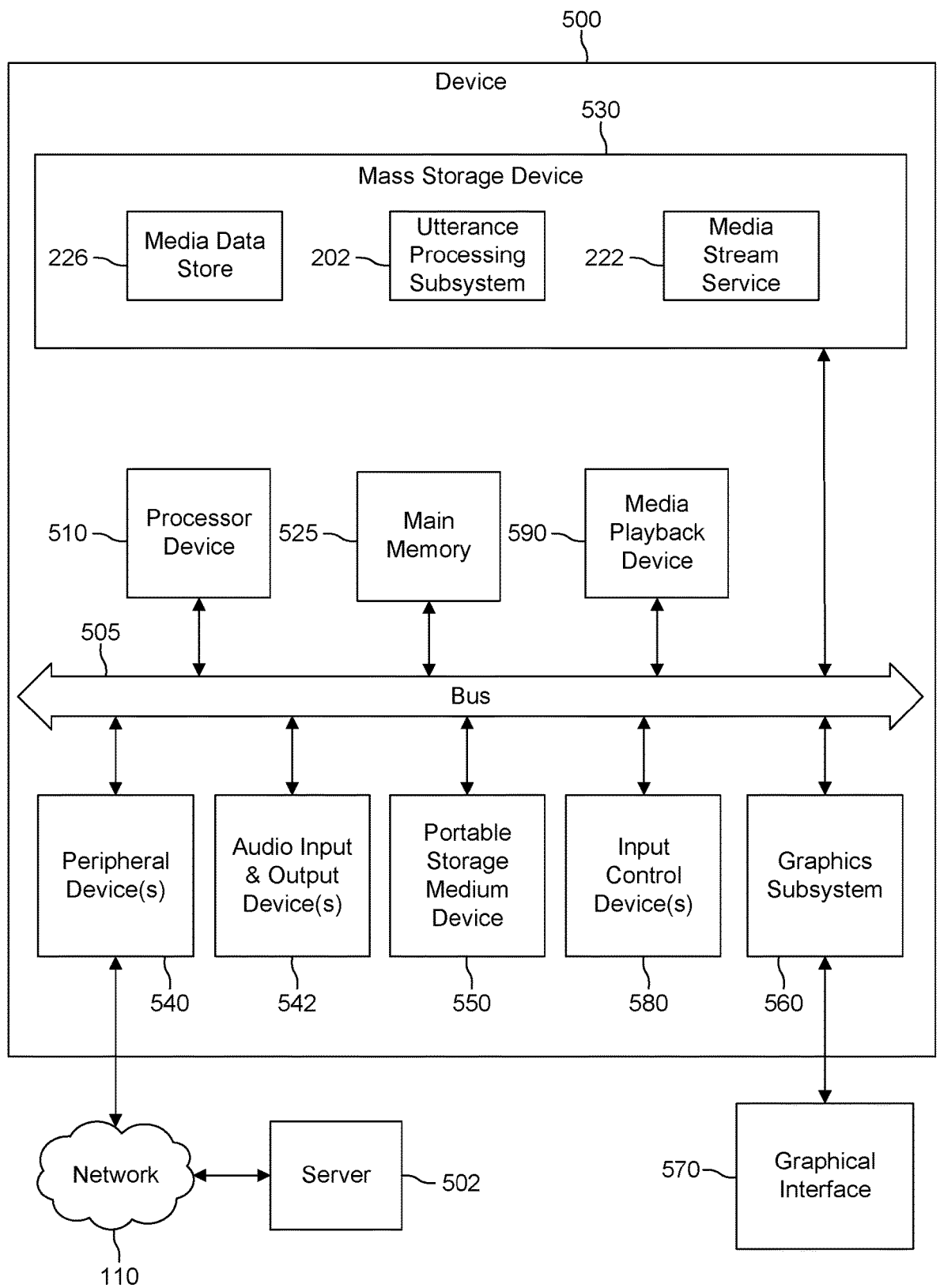
FIG. 6 is a block diagram showing an exemplary device constructed to realize one or more aspects of the example embodiments described herein.

FIG. 6 is a block diagram showing an exemplary device 500 constructed to realize one or more aspects of the example embodiments described herein. In some examples, the device 500 corresponds to the media playback device 102 (FIG. 1). In these examples, the media playback device 102 may be connected over the network 110 to one or more servers 502 or other remote devices. The one or more servers 502 can include one or more components described below in relation to the device 500, including a mass storage device and a processor device. That is, various operations and processes described herein can be performed by the cooperation of two or more devices, systems, processes, or combinations thereof. Such a division of operations provides for efficient use of computing resources because servers are generally more powerful than the media playback device 102.

In other examples, the device 500 is at least partially remote from the media playback device 102 (FIG. 1) and linkable to the media playback device 102 via the network 110; thus, all or portions of the device 500 correspond, in some examples, to components of one or more servers remotely accessible by the media playback device 102. For example, the device 500 includes one or more of the components of the system 100 (FIG. 1) other than the media playback device 102.

The device 500 includes a processor device 510, which can correspond to the one or more processing devices 214 (FIG. 1) described above. Also included are a main memory 525 and an interconnect bus 505. The processor device 510 may include without limitation a single microprocessor, or may include a plurality of microprocessors for configuring the device 500 for providing the functionalities described herein. The main memory 525 stores, among other things, instructions and/or data for execution by the processor device 510. The main memory 525 may include banks of dynamic random access memory (DRAM), as well as cache memory.

The device 500 may further include a mass storage device 530, peripheral device(s) 540, audio input device(s) 542 (e.g., a microphone), portable non-transitory storage medium device(s) 550, input control device(s) 580, a media playback device 590 (e.g., a speaker), a graphics subsystem 560, and/or an output interactive graphical interface 570. For explanatory purposes, all components in the device 500 are shown in FIG. 6 as being coupled via the bus 505. However, the device 500 is not so limited. Elements of the device 500 may be coupled via one or more data transport means. For example, the processor device 510, and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 can also store the items themselves, e.g., account information, the taste profile(s) 242 (FIG. 1), the media data store 226, the utterance processing subsystem 202, etc. The mass storage device 530 may be implemented, for example, with a magnetic disk drive or an optical disk drive. In a software embodiment, the mass storage device 530 is configured for loading contents of the mass storage device 530 into the main memory 525. Memory may be embodied as one or more of mass storage device 530, main memory 525, or portable storage medium device 550.

The mass storage device 530 may also include software that, when executed, causes the device 500 to perform the features described above, including but not limited to the functions of the ASR 252 (FIG. 2), the NLU processor 254 (FIG. 2), the selector 70 (FIG. 2), and arbitrator 74 (FIG. 2).

The portable storage medium device 550 operates in conjunction with a nonvolatile portable storage medium, such as, for example, a solid state drive (SSD), to input and output data and code to and from the device 500. In some embodiments, the software for storing information may be stored on a portable storage medium device 550, and may be inputted into the device 500 via the portable storage medium device 550. The peripheral device(s) 540 may include any type of computer support device, such as, for example, an input/output (I/O) interface configured to add additional functionality to the device 500. For example, the peripheral device(s) 540 may include a network interface card for interfacing the device 500 with a network 110. The audio input devices 542 may be one or more devices configured to receive or obtain audio and provide a representation of the audio (e.g., as an audio clip or file) as output. Thus, the audio input device(s) 542 may include one or more microphones or other devices.

The input control device(s) 580 provide a portion of an interface for the device 500. The input control device(s) 580 may include a keypad and/or a cursor control and/or a touch screen. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 500 may include the graphics subsystem 560 and the graphical interface 570. The graphical interface 570 may include a display such as a TFT (Thin Film Transistor), TFD (Thin Film Diode), OLED (Organic Light-Emitting Diode), AMOLED display (active-matrix organic light-emitting diode), and/or liquid crystal display (LCD)-type displays. The displays can also be touchscreen displays, such as capacitive and resistive-type touchscreen displays.

The graphics subsystem 560 receives textual and graphical information, and processes the information for output to the output display of the interactive graphical interface 570.

Input control devices 580 can control the operation and various functions of device 500. Input control devices 580 can include any components, circuitry, or logic operative to drive the functionality of device 500. For example, input control device(s) 580 can include one or more processors acting under the control of an application.

Each component of the device 500 may represent a broad category of a computer component of a general and/or special purpose computer. Components of the device 500 are not limited to the specific implementations provided herein.

Software embodiments of the examples presented herein may be provided as a computer program product, or software that may include an article of manufacture on a machine-accessible or machine-readable media having instructions. The instructions on the non-transitory machine-accessible, machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, engine, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A natural language processing system, comprising:
an automated speech recognizer configured to generate text transcriptions from an utterance;
a natural language understanding subsystem configured to receive the text transcriptions and provide slot-intent models as output including a slot-intent model corresponding to each of at least two of the text transcriptions, wherein each slot-intent model includes an intent and one or more slots having key-value pairs;
a fulfillment manager configured to receive the slot-intent models and start a service based thereon, wherein the fulfillment manager includes:
a fulfillment strategy data store that stores fulfillment strategies, each fulfillment strategy describing rules for starting one of a plurality of services;
a strategy selector that selects, for at least two of the slot-intent models, a selected fulfillment strategy from the fulfillment strategies based on a given slot-intent model, wherein the selected fulfillment strategies are each paired with a corresponding one of the slot-intent models to generate pairings; and
an arbitrator configured to receive the pairings, choose a chosen pairing of the pairings, and initiate one of the services from the plurality of services associated with the chosen pairing, thereby resulting in an initiated service,
wherein the arbitrator is configured to choose the chosen pairing by determining that a first affinity for a first media content item associated with the slot-intent model of the chosen pairing exceeds a second affinity for a second media content item associated with the slot-intent model of another of the pairings, the first affinity and the second affinity being determined from taste profile items within a taste profile of an account associated with the utterance, the taste profile being based, in part, on information about historical plays of media content, the taste profile items being associated with pre-stored identifiers corresponding to one or more services from the plurality of services,
wherein the arbitrator is configured to choose the chosen pairing by, prior to the determining, eliminating at least one of the pairings based on at least one rule to provide a plurality of remaining pairings of the pairings; and
wherein the determining is performed with respect to the remaining pairings only.

2. The system of claim 1, wherein the initiated service includes to playback the first media content item via a media playback device.

3. The system of claim 1, wherein the initiated service includes to recommend playback of the first media content item.

4. The system of claim 1, wherein the automated speech recognizer or the natural language understanding subsystem eliminates one of the text transcriptions using a text transcription elimination rule, thereby resulting in an eliminated text transcription, and
wherein the natural language understanding subsystem does not output a slot-intent model output corresponding to the eliminated text transcription.

5. The system of claim 4, wherein the one of the text transcriptions is eliminated based on a text string hypothesis confidence score that is below a predefined threshold text string hypothesis confidence score.

6. The system of claim 1, wherein the natural language understanding subsystem or the fulfillment manager eliminates one of the slot-intent models based on a slot-intent model elimination rule, thereby resulting in an eliminated slot-intent model;
wherein the strategy selector does not output a fulfillment strategy corresponding to the eliminated slot-intent model; and
wherein the one of the slot-intent models is eliminated based on a slot-intent model confidence score that is below a predefined threshold slot-intent model confidence score.

7. The system of claim 1, wherein the first affinity and the second affinity are determined based on media content play activity associated with the account.

8. The system of claim 1, wherein the first affinity and the second affinity are determined based on selections of media content items for a playlist associated with the account.

9. The system of claim 1, wherein the first affinity and the second affinity are determined based on a first artist associated with the first media content item and a second artist associated with the second media content item, the second artist being different from the first artist.

10. A computer-implemented method, comprising:
generating text transcriptions from an utterance;
generating slot-intent models corresponding to at least two of the text transcriptions, each slot-intent model including an intent and one or more slots having key-value pairs;
starting a service based on the slot-intent models, including:
selecting a fulfillment strategy from a plurality of fulfillment strategies for at least two of the slot-intent models, the selected fulfillment strategies each being paired with a corresponding one of the slot-intent models to generate a pairings, each fulfillment strategy describing rules for starting one of a plurality of services;
choosing a chosen pairing of the pairings; and
initiating the service associated with the chosen pairing, thereby resulting in an initiated service,
wherein the choosing includes determining that a first affinity for a first media content item associated with the slot-intent model of the chosen pairing exceeds a second affinity for a second media content item associated with the slot-intent model of another of the pairings, the first affinity and the second affinity being determined from taste profile items within a taste profile of an account associated with the utterance, the taste profile being based, in part, on information about historical plays of media content, the taste profile items being associated with pre-stored identifiers corresponding to one or more services from the plurality of services,
wherein the choosing includes, prior to the determining, eliminating at least one of the pairings based on at least one rule to provide a plurality of remaining pairings of the pairings; and
wherein the determining is performed with respect to the remaining pairings only.

11. The method of claim 10, wherein the initiated service includes playing back of the first media content item via a media playback device.

12. The method of claim 10, wherein the initiated service includes recommending playback of the first media content item.

13. The method of claim 10, further comprising:
eliminating one of the text transcriptions using a text transcription elimination rule, and
wherein the slot-intent models do not include a slot-intent model corresponding to the eliminated text transcription.

14. The method of claim 13, wherein the eliminating is based on a text string hypothesis confidence score that is below a predefined threshold text string hypothesis confidence score.

15. The method of claim 10, further comprising:
eliminating one of the slot-intent models based on a slot-intent model elimination rule,
wherein a fulfillment strategy corresponding to the eliminated slot-intent model is not selected; and
wherein the eliminating is based on a slot-intent model confidence score that is below a predefined threshold slot-intent model confidence score.

16. The method of claim 10, wherein the first affinity and the second affinity are determined based on media content play activity associated with the account.

17. The method of claim 10, wherein the first affinity and the second affinity are determined based on selections of media content items for a playlist associated with the account.

18. The method of claim 10, wherein the first affinity and the second affinity are determined based on a first artist associated with the first media content item and a second artist associated with the second media content item, the second artist being different from the first artist.

* * * * *